Oct. 23, 1956  A. L. MENNESSON  2,767,912
FLUID CONSUMPTION RATE INDICATORS
Filed Nov. 26, 1954  2 Sheets-Sheet 1

INVENTOR
André Louis Mennesson
BY
Bailey, Stephens and Huettig
ATTORNEYS

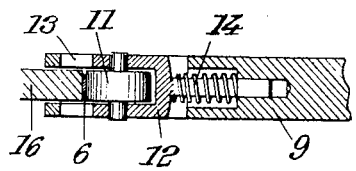
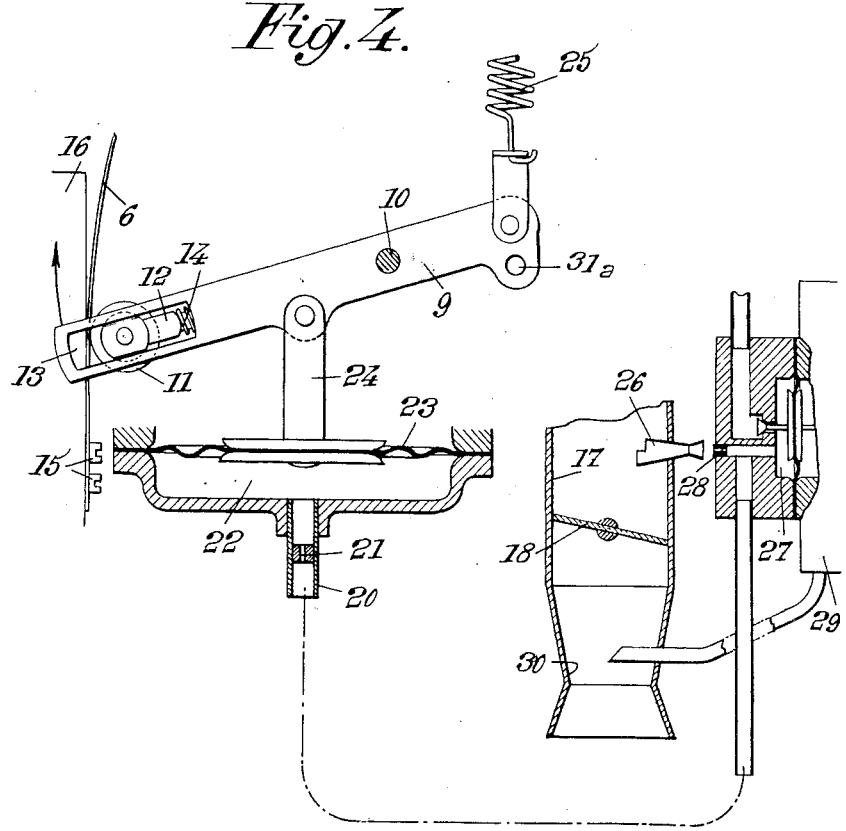

United States Patent Office 2,767,912
Patented Oct. 23, 1956

2,767,912

FLUID CONSUMPTION RATE INDICATORS

Andre Louis Mennesson, Neuilly-sur-Seine, France, assignor to Societe d'Appareils de Controle et d'Equipement des Moteurs S. A. C. E. M., Neuilly-sur-Seine, France, a society of France Application November 26, 1954, Serial No. 471,438

Claims priority, application France December 5, 1953

2 Claims. (Cl. 235—61)

The present invention relates to an apparatus for indicating the instantaneous consumption of a fluid, for instance fuel, by a machine including a rotating shaft, that is to say for indicating at any time either the ratio of the number of revolutions per unit of time of said shaft to the flow rate of said fluid per unit of time or, what is tantamount thereto, the ratio of this flow rate of fluid per unit of time to the number of revolutions of said shaft per unit of time.

When the machine is an internal combustion engine driving an automobile vehicle, the desired indications may be given in the form of the distance travelled over by said vehicle per unit of volume, for instance in miles per gallon, for a given gear combination of the gear box.

Such apparatus make it possible to know at any time the instantaneous fuel consumption of the engine expressed in one of the usual ways, for instance in liters of fuel per 100 kilometers or in miles travelled per gallon, or again in liters per number of revolutions per minute of the engine. It will be readily understood that the use of such apparatus makes it possible to run the engine in the best possible consumption conditions.

The object of the present invention is to provide a consumption indicator of this type which is better adapted to meet the requirements of practice than those existing at the present time.

For this purpose I make use, as one of the elements of the indicator apparatus, of a tachometer including a movable pointer subjected to the opposed actions of a driving force variable with the speed of the rotating shaft and of a leaf spring a variable portion of which is tightly applied against a rigid wall and, according to my invention, I combine with such a tachometer means responsive to variations of the flow rate per unit of time of said fluid for increasing the length of said portion of said leaf spring when said fluid flow rate increases, and vice versa.

Preferred embodiments of the present invention will be hereinafter described with reference to the accompanying drawings, given merely by way of example and in which:

Fig. 3 is a sectional view on the line III—III of Fig. 1.

Fig. 4 is a view similar to Fig. 1 showing another embodiment of the consumption indicator according to my invention.

In the following description it will be supposed that the invention is applied to a fuel consumption indicator for an internal combustion engine driving a motor vehicle.

Figure 2:
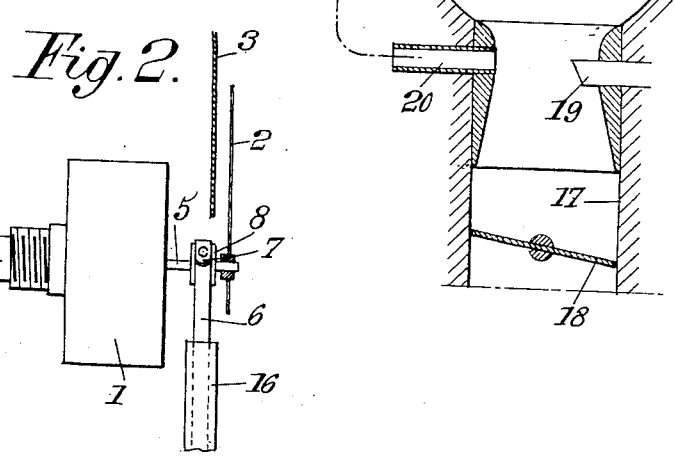
Fig. 2 is a partial side view of the apparatus of Fig. 1.

The apparatus comprises a tachometer 1 including a rotating indicator member such as a drum, a dial or preferably, as shown by the drawing, a pointer 2 moving in front of a fixed dial 3 provided with a suitable scale. Said tachometer is driven by a rotating shaft of the engine through a transmission 4 (Fig. 2), preferably a flexible one, so as to exert upon a shaft 5 on which pointer 2 is fixed, a driving torque varying with the speed of revolution of said shaft. Said driving torque is balanced by the action of a return spring.

Tachometer 1 may be of any suitable type (of mechanical, electrical, magnetic or other type) so that, for a given speed of the rotating shaft, there is a given driving torque exerted on the shaft 5 of pointer 2. Such tachometers are well known in the art and it is therefore unnecessary to describe the particular construction of one of them.

According to my invention, the return spring is in the form of a flexible leaf or plate 6 one of the ends of which is fixed to the frame of the apparatus and the other end of which is connected to the shaft 5 of pointer 2, for instance through a flexible band 7 wound on a drum 8 fixed on said shaft 5.

The means for varying the action of said spring in response to variations of the instantaneous fuel flow rate as above mentioned are advantageously made as follows:

A lever 9 (Figs. 1 and 4) is mounted in such manner as to be rotated in the direction of the arrow about pivot axis 10 through an angle the greater as the instantaneous fuel flow rate is higher. One end of this lever 9 carries a roller 11 mounted in a fork 12 slidable in a recess 13 of lever 9, this roller being urged toward the end of lever 9 by a spring 14 (a detail of this arrangement is visible on Fig. 3). This roller 11 bears against spring 6 the lower end of which is fixed by screws 15 on a straight edge 16 of the apparatus frame. The respective characteristics of springs 6 and 14 are such that spring 6 is applied against edge 16 from its lower end (screws 15) to the point where roller 11 is applied against said edge 16, whereby the effective length of spring 6 is limited by said roller 11.

When no driving torque is exerted by the tachometer on pointer 2 (i. e. when the engine is not running), spring 6 is applied against edge 16 over the whole length thereof, spring 6 being rectilinear in the state of rest. Lever 9 can then oscillate without producing any displacement of pointer 2.

When the tachometer exerts a driving torque on pointer 2 (the internal combustion engine then running at a given speed), the active portion of spring 6 located above roller 11 is pulled away from edge 16 and the reaction of said spring increases more and more as the length of the effective portion thereof decreases, that is to say as the instantaneous fuel flow rate increases. The antagonistic torque exerted on pointer 2 is of course determined by the reaction of spring 6.

To sum up, for a given speed of the rotating shaft of the engine, the antagonistic torque exerted on pointer 2 is the greater as the fuel flow rate is higher. On the other hand, for a given fuel flow rate, the driving torque exerted on the pointer is the greater as the speed of the rotating shaft of the engine is higher.

By suitably calculating and adjusting the elements of the apparatus (characteristics of the springs, length of the lever arms, etc.) it will be possible, for a given instantaneous consumption of fuel, i. e. for a given ratio of the fuel flow rate per unit of time to the number of revolutions per unit of time of the engine shaft, to obtain a well determined position of pointer 2 with respect to dial 3, whereby said dial can be provided with a scale marked in instantaneous consumption units, for instance in liters per 100 km., or in miles per gallon.

The means for controlling lever 9 in accordance with the instantaneous fuel flow rate may include a deformable box in which the pressure is equal or proportional to that existing at a suitably chosen point of the engine carburation system, as indicated in prior French Patent No. 644,723 of the 13th March 1953.

When the engine is fed with fuel through a carburation system working under the effect of suction, it is advantageous to make use of the suction existing in the induction pipe 17 of the engine (Fig. 1) at a suitably chosen point upstream of the throttle valve 18, for instance opposite the nozzle orifices 19 of said carburation system. This suction is transmitted, through a pipe 20 advantageously provided with a calibrated orifice 21, to the inside of a chamber 22 one of the walls of which is constituted by a diaphragm 23. Diaphragm 23 is connected, through a rod 24, with oscillating lever 9 and a spring 25 yieldingly opposes the efforts exerted on diaphragm 23 by the suction existing in chamber 22. Of course, spring 25 can be replaced by a system of multiple springs making it possible to choose at will the law of displacement of lever 24 as a function of the instantaneous fuel flow rate.

It will be readily understood that to every value of the instantaneous fuel flow rate there corresponds a given air flow rate through the induction pipe 17 of the engine, and therefore a given suction in chamber 22 determining the position of rod 24 and of lever 9.

When the engine carburation system is of the so-called pressure type, fuel is fed into induction pipe 17 through an orifice 26 (Fig. 4), preferably but not necessarily located downstream of throttle valve 18, under the effect of the pressure to which fuel is subjected in a chamber 27 located upstream of a main fuel jet 28. The pressure in chamber 27 is adjusted by the action of a diaphragm forming a deformable partition between said wall and a space, inside a casing 29, connected through a conduit with the inside of a Venturi tube 30 provided in induction pipe 17; the suction existing in said venturi 30 can be considered as corresponding to the air flow rate through tube 17. The pressure of the fuel existing in chamber 27 is transmitted through a tube 20 to a deformable box, identical to that shown on Fig. 1. The only difference is that, with such a construction, increases in the instantaneous fuel flow rate cause chamber 22 to expand and rod 24 to move upwardly (whereas in the arrangement of Fig. 1 an increase of the fuel flow rate produced a retraction of chamber and a downward displacement of rod 24). However the connection of rod 24 with lever 9 must be such that in both cases pointer 2 is moved in the same direction in response to similar variations of the fuel flow rate.

Figure 1:
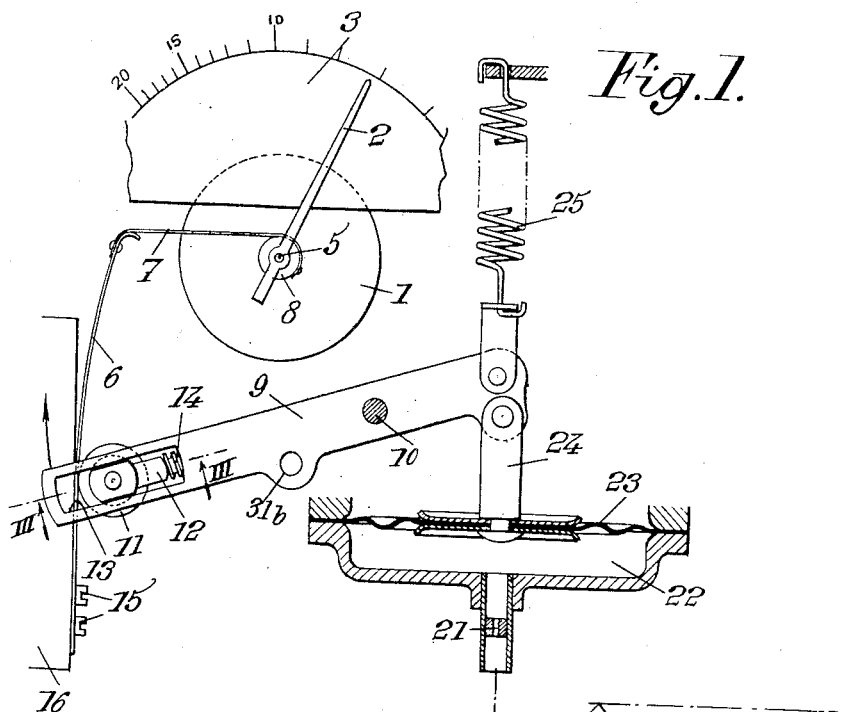
Fig. 1 is an elevational view partly in section diagrammatically showing a consumption indicator made according to a first embodiment of my invention.

For this purpose, rod 24 is connected to lever 9 at a point located between the point of oscillation 10 of said lever and roller 11 (Fig. 4) instead of being connected thereto at a point located on the other side of pivot point 10 from roller 11 as in Fig. 1. It should be noted that the same oscillating lever 9 can be used in both of these arrangements if it is provided with two holes 31a, 31b either of which is used in every case.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with a machine including a rotating shaft and which consumes a fluid, an apparatus of the type described which comprises, in combination, a casing, a drum pivoted in said casing, a pointer rigid with said drum, means movably carried by said casing and operatively connected with said shaft for exerting on said drum in one direction a force variable in accordance with the number of revolutions per unit of time of said shaft, said casing having one rigid wall, a leaf spring fixed at one end to said casing wall, flexible means for connecting the other end of said spring with a point of the periphery of said drum so that said leaf spring yieldingly opposes said driving force exerted on said pointer, a lever pivoted to said casing about an axis parallel to the generatrices of the cylindrical surface formed by said leaf spring when it is bent, said lever being located opposite said leaf spring, a member slidably guided in said lever longitudinally thereto, a roller journalled in said member about an axis parallel to said axis, resilient means between said lever and said member for urging said roller against said leaf spring so as to apply against said casing wall a variable portion of said leaf spring starting from said fixed end thereof, the length of said portion being the greater as said lever is more and more rotated in one direction, and means responsive to variations of the flow rate per unit of time of said fluid consumed by said machine for rotating said lever in said direction with an amplitude the greater as said flow rate increases and vice-versa.

2. For use in connection with a machine including a rotating shaft and which consumes a fluid, an apparatus of the type described which comprises, in combination, a casing, a drum pivoted in said casing, a pointer rigid with said drum, means movably carried by said casing and operatively connected with said shaft for exerting on said drum in one direction a force variable in accordance with the number of revolutions per unit of time of said shaft, said casing having one rigid wall, a leaf spring fixed at one end to said casing wall, flexible means for connecting the other end of said spring with a point of the periphery of said drum so that said leaf spring yieldingly opposes said driving force exerted on said pointer, means movably mounted in said casing for applying against said casing wall a variable portion of said leaf spring starting from said fixed end thereof, and means responsive to variations of the flow rate per unit of time of said fluid consumed by said machine for operating said movably mounted means to increase the length of said portion of said leaf spring when said flow rate increases and vice versa.

References Cited in the file of this patent

UNITED STATES PATENTS

| 1,955,754 | Lyon | Apr. 24, 1934 |
| 2,268,549 | Kennedy | Jan. 6, 1942 |
| 2,522,299 | Redue | Sept. 12, 1950 |
| 2,593,628 | Strong | Apr. 22, 1952 |